United States Patent [19]

Beutier et al.

[11] Patent Number: 4,640,710
[45] Date of Patent: Feb. 3, 1987

[54] PROCESS FOR RECOVERING SILVER FROM SULFATE SOLUTIONS

[75] Inventors: Didier Beutier, Paris; Jean-Jacques Predali, Elancourt, both of France

[73] Assignee: Societe Miniere et Metallurgique de Penerroya, Paris, France

[21] Appl. No.: 678,998

[22] Filed: Dec. 6, 1984

[30] Foreign Application Priority Data

Dec. 9, 1983 [FR] France ............................... 83 19825

[51] Int. Cl.$^4$ ............................................. C22B 11/04
[52] U.S. Cl. ........................................ 75/108; 75/109; 75/118 R; 423/37; 423/42; 204/109
[58] Field of Search .................... 75/108, 109, 101 R, 75/118 R; 423/37, 27, 42; 204/109

[56] References Cited

U.S. PATENT DOCUMENTS

| 935,337 | 9/1909 | Thwaites | 423/42 |
| 3,902,896 | 9/1975 | Borbely | 75/109 |
| 4,278,539 | 7/1981 | Santhanam et al. | 423/37 |

FOREIGN PATENT DOCUMENTS 2313452 12/1976 France .
762986 5/1976 South Africa .

Primary Examiner—John Doll
Assistant Examiner—Robert L. Stoll
Attorney, Agent, or Firm—Fleit, Jacobson, Cohn & Price

[57] ABSTRACT

The invention relates to a process for recovering silver in sulfuric solutions. Its characterizing feature is that the silver solution is contacted with a quantity of zinc sulfide which is at least equal to the stoichiometric quantity and the surface area of which is at least equal to K $Ag^{\frac{2}{3}}$ x V, K being a constant, Ag being the silver concentration in the solution expressed in kilograms per cubic meter, and V the volume of the solution in cubic meters, the surface area being expressed in square meters and the value of K being greater than or equal to approximately 10. Application to the recovery of silver in zinc plant residues.

8 Claims, No Drawings

PROCESS FOR RECOVERING SILVER FROM SULFATE SOLUTIONS

BACKGROUND OF THE INVENTION

The subject of the present invention is the recovery of silver present in sulfuric solutions.

In many metallurgies silver occurs in solution in a sulfuric medium, particularly in plants for recovering zinc in an electrolyte phase.

This phase is frequently poorly recovered and many studies have been conducted to recover this silver. Thus, it is possible to mention French Pat. No. 2,313,452, which has certainly contributed some progress without this progress being decisive because the process is not applicable in every case.

In addition, numerous processes exist in which silver passes into a sulfuric medium without being capable of being recovered.

The subject of the present invention is the recovery of silver in a sulfuric medium with the aid of sphalerite.

This aim is attained by means of a process for recovering silver in sulfuric solution, in which the said silver solution is contacted with a quantity of zinc sulfide which is at least equal to the stoichiometric quantity and the surface area of which is at least equal to $K \, Ag^{170} \times V$, K being a constant, Ag being the concentration of silver in the solution expressed in kilograms per cubic meter and V the volume of the solution in cubic meters, the surface area being expressed in square meters and the value of K being greater than or equal to approximately 10.

It is quite obvious that the higher the coefficient K chosen, the better will be the recovery of silver, but the lower will be the concentration of silver in the sphalerite.

The examples which will be set out below show that it is possible to obtain very high silver concentration and that it can be desirable to carry out a countercurrent precipitation.

The silver-bearing sphalerite thus formed can be recovered by any means known per se, for example, by filtration, flotation, density separation or physical elutriation.

This recovery method is of particular interest because it is possible to introduce the sphalerite at any leaching stage where the silver occurs in a soluble form, which makes it possible to cause an accumulation of silver in the particles of sphalerite, a sulfur-containing compound which is easy to recover despite the presence of lead sulfate and zinc ferrite which are frequently found in leaching residues.

It is of interest to note that the content of zinc and of sulfate has very little effect on the recovery and on the final concentration of silver.

When silver-complexing ions are present in the sulfate medium, it will be appropriate to make a correction of the silver content and to replace the value of Ag by the value of $Ag^+$ which is really free, a value which is easily determined from the knowledge, or measurement, of the silver complexing constant or constants with the said complexing agents. The above relationship then becomes $S = K(Ag_f)^{2/3}(Ag_t)/(Ag_f)V$, where $Ag_f$ is the free silver concentration, $Ag_t$ is the total silver concentration; this relationship is equally valid in the case of a suspension of a poorly soluble silver salt where the free silver concentration is at least equal to $10^{-7}$, preferably at least equal to $10^{-5}$.

It can also be noted that it is advantageous to employ zinc sulfide of extremely fine particle size so that the specific surface of the zinc is very high and that in this way it is possible to obtain simultaneously very high degrees of recovery and a high concentration.

Any zinc sulfides may be employed, whether they be of chemical origin or mineral origin (sphalerite). In general, for economic reasons, preference would be given to very finely ground sphalerite, in general a sphalerite whose $d_{80}$ is below 10 micrometers.

The optimum conditions which must be combined in the silver sulfate solutions are as follows:

(1) Temperature: from ambient to 100° C., preferably from 50° to 80° C. when atmospheric pressure is employed; higher temperatures may be chosen when it is intended to work at higher pressures.

(2) Pressure: atmospheric pressure. In fact, the value of the pressure has only a minor effect on the method described in the present application.

(3) pH: the pH has no marked effect on the process. The only limits to observe are: in the case of the lower limit, the pH value under which the sphalerite is attacked by protons to produce hydrogen sulfide which is released; in the case of the upper limit, the pH value beyond which the silver concentration becomes lower than $10^{-6}$M. Preferably, a pH of between 1 and 4 will be chosen.

(4) Redox potential: the solution potential should be such that it does not attack the sphalerite by oxidizing the latter. The potential may be fixed by any suitable means which does not entail the precipitation of silver by cementation. Preferably, use is made of sphalerite which, in this case, does not need to be finely divided. It is also possible to employ the same sphalerite in the same state of division as for the process, which makes it possible to carry out the reduction of the solution at the same time as the silver precipitation. It is self-evident that the quantity of sphalerite required is that corresponding to the reduction of the elements capable of oxidizing it.

(5) Duration: the reaction is fast and may be estimated at less than one-half hour. For safety a time equal to one hour or between one hour and two hours will therefore be chosen.

The following non-restrictive examples are intended to enable the experts to determine readily the operating conditions which should be employed in each particular case.

EXAMPLE 1

The ability of silver sulfide to attach itself to zinc sulfide is determined, under conditions close to those of the neutral digestion of the sulfur-containing ores.

For this purpose, use is made of a silver sulfate solution containing 2 grams per liter kept at 60° C., in the presence of zinc sulfate, if appropriate, and the behavior of the silver after addition of chemical zinc sulfide or of sphalerite is observed, the reaction time being two hours.

| Test | ZINC | | | | SILVER | | |
|---|---|---|---|---|---|---|---|
| | Type | Quantity Weight g | Zn/Ag | ZnSO$_4$ | Feed g | Delivery g | Yield % |
| 1 | chemical ZnS | 1.3 | 2 | — | 2.1 | 0.55 | 73.8 |
| 2 | chemical ZnS | 6.5 | 10 | — | 2.1 | 0.01 | 99.5 |
| 3 | chemical ZnS | 1.3 | 2 | 2 M/1 | 2.25 | 0.61 | 72.9 |
| 4 | chemical ZnS | 6.5 | 10 | 2 M/1 | 2.25 | 0.02 | 99.0 |
| 5 | 61.46% blende | 1.3 | 2 | — | 2.15 | 2.10 | 2.3 |
| 6 | 61.46% blende | 6.5 | 10 | — | 2.15 | 1.85 | 14.0 |

The results of these tests show that chemical zinc sulfide makes it possible to fix the greatest proportion of the silver and, when it is present in a large stoichiometric excess, virtually all the silver, while sphalerite appears to fix only a small part of it. However, the sphalerite employed is relatively low in activity because it is not finely ground. Moreover, it is found that when the reaction can continue for a longer time, the proportion of silver which can be fixed is considerably greater. Consequently, under conditions of vigorous stirring, at relatively high temperature and over a relatively long time, that is to say under the conditions employed for leaching sulfur-containing zinc ores, the effect of the sphalerite.

EXAMPLE 2

This example illustrates the attachment of silver to zinc sulfide in the leaching residue of a zinc plant.

A separation is carried out of zinc sulfide enriched with silver present in a sample of low-zinc residue referred to as "ferrite", because it contains much iron in the form of zinc ferrite. This residue contains 100 grams per ton of silver, 19.6% of zinc and 26.7% of iron.

The processing of the residue includes the following operations:

(1) grinding the residue to a particle size of 40 micrometers;
(2) conditioning at 16% solids content for 19 minutes, with addition of lime, the pH produced being equal to 12;
(3) second conditioning for 10 minutes with addition of copper sulfate in a proportion of approximately 800 grams per ton;
(4) rough flotation for 30 minutes; and
(5) two further washes, with a flotation time of 15 minutes each.

The results obtained are shown in the following table:

| Product | % P | Contents g/t Ag | % Zn | Fe | Recovery % Ag | Zn | Fe |
|---|---|---|---|---|---|---|---|
| Concentrate | 8.35 | 1037 | 33 | 16.4 | 72.8 | 14.1 | 5.1 |
| Waste | 91.65 | 35.3 | 18.4 | 27.7 | 27.2 | 85.9 | 94.0 |
| Feed | 100 | 119 | 19.6 | 20.7 | 100 | 100 | 100 |

EXAMPLE 3

This example illustrates the effect of the surface area of the sphalerite on silver fixation.

The operating conditions are as follows:
Temperature: 60°
pH: 3.5
Solution volume: 0.5 liter
Initial silver concentration: 0.7 g/l.
Two sphalerite qualities are employed:
(a) ground to 125 micrometers, having a specific surface of 0.10 m$^2$/g;
(b) ground to 40 micrometers, having a specific surface of 0.23 m$^2$/g.

The precipitation of silver is carried out for two hours and the residual silver in solution is determined.

| Test | Added sphalerite g | Equivalent Surface m$^2$ | Silver Fixed mg/l |
|---|---|---|---|
| 1 | (a) 6.5 | 0.65 | 190 |
| 2 | (b) 6.6 | 1.50 | 228 |
| 3 | (b) 10 | 2.3 | 350 |
| 4 | (b) 21 | 4.8 | 697 |

The following table confirms this effect for a solution containing 4.2 grams of silver per liter, tests with chemical zinc sulfide (specific surface: 7.40 m$^2$/g) being included:

| Added sphalerite g | Equivalent Surface m$^2$ | Silver Fixed mg/l |
|---|---|---|
| (a) 2.1 | 0.21 | 100 |
| (b) 10.5 | 1.05 | 600 |
| (c) 21.0 | 2.1 | 760 |
| (d) 21.0 | 4.83 | 1 480 |
| ZnS 1.3 | 9.62 | 3 100 |
| ZnS 6.5 | 48.1 | 4 200 |

We claim:

1. A process for recovering silver in sulfuric solutions having a pH less than 4 and a temperature between 50° and 80° C., which comprises adjusting the redox potential of the solutions to the equilibrium value with sphalerite and contacting said silver solutions with a quantity of zinc sulfide which is at least equal to the stoichiometric quantity of silver in said solutions and the surface area of which is at least equal to K Ag$^{\frac{1}{2}}$ × V, Ag being the concentration of silver in the solution expressed in kilograms per cubic meter and V the volume of the solution in cubic meters, the surface area being expressed in square meters and the value of K being greater than or equal to approximately 10.

2. The process of claim 1, wherein K is greater than 20.

3. The process of claim 1, wherein K is between 20 and 50.

4. The process of claim 1, wherein the pH of the solution is between 1 and 4.

5. The process of claim 1, wherein the redox potential is adjusted before the silver precipitation operation.

6. The process of claim 1, wherein the redox potential is adjusted during the silver precipitation operation by adding to the quantity required to precipitate the silver an excess of sphalerite sufficient for reducing the species capable of oxidizing the sphalerite.

7. The process of claim 1, wherein the silver solution additionally contains a silver salt selected from the group consisting of low-solubility salts and complex salts and wherein the surface area required for silver precipitation is equal to $S = K(Ag_f)^{\frac{1}{2}}(Ag_t)/(Ag_f) V$, where $Ag_f$ is the free silver concentration, and $Ag_t$ is the total silver concentration.

8. The process of claim 1, wherein the sphalerite employed is ground to a particle size corresponding to a $d_{80}$ of below 10 micrometers.

* * * * *